Patented May 18, 1937

2,080,498

UNITED STATES PATENT OFFICE 2,080,498

MANUFACTURE OF PERFUME BASES

Walter Christian Meuly, New Brunswick, N. J., assignor to E. I. du Pont de Nemours & Company, Wilmington, Del., a corporation of Delaware No Drawing. Application September 6, 1935, Serial No. 39,443

7 Claims. (Cl. 260—132)

This invention relates to the manufacture of perfume bases. More particularly this invention deals with an improved process for separating the isomers of α-methyl-ionone.

Methyl-ionone is generally manufactured by condensing first methyl-ethyl-ketone with the aliphatic aldehyde citral. The immediate reaction product is an open chain compound known as ψ-methyl-ionone. It is believed that the aldehyde group of the citral enters into condensation with either the $CH_2$ group or the $CH_3$ group which is adjacent to the CO group in the ketone; consequently the product consists of two isomers. (German Patent No. 150,827.) In a second stage of the process the ψ-methyl-ionone is subjected to isomerization by the aid of an acid, whereby part of the molecule rearranges to form a closed ring. During this rearrangement there is again an opportunity to form two isomers. The consequence is, that the resultant methyl-ionone consists of a mixture of 4 isomers, which have been identified in the art by the names α-methyl-ionone a, α-methyl-ionone b, β-methyl-ionone a and β-methyl-ionone b.

In the German patent above mentioned, and in the subsequent art, the separation of these isomers has been accomplished by converting them into chemical derivatives thereof, for instance by reacting them with bisulfite, hydroxylamine, semi-carbazide or phenyl-hydrazine, and then separating the addition compounds or reaction products thus obtained by fractional crystallization. After separation, the isomers could be converted into the original, free methyl-ionones by suitable treatment, such as hydrolysis. It is clear that these methods are quite laborious, and involve the consumption of expensive chemicals. Furthermore, the losses inevitable upon each transformation reduce the net yield of final product.

It is an object of this invention to provide an efficient and economical method for separating the above named isomers of methyl-ionone. It is a particular object of this invention to provide a process for separating the a and b constituents of the α-isomer of methyl-ionone. It is a further object of this invention to provide a process for separation of the mthyl-ionone isomers, which is applicable directly to the mthyl-ionone as obtained in the isomerization of ψ-methyl-ionone, without transforming the mthyl-ionone first into chemical derivatives of the same. Other and further important objects of my invention will appear as the description proceeds.

I have found that formic acid has a selective solvent action for the isomers of α-methyl-ionone.

Based on this discovery, the improved method of my invention herein discussed, consists of fractionally segregating the isomers of α-methyl-ionone from a complete or partial solution thereof in moderately concentrated formic acid, that is formic acid of between 60 and 90% strength.

The quantity of acid employed, the temperature of the solution, and the detailed steps of procedure may vary considerably and will generally depend on the composition of the particular mixture being treated. Repeated separation at different temperature levels may be resorted to. Alternatively, the acid solution may be continually diluted with water in successive steps. The former method is to be preferred, because it enables one to reuse the formic acid solution repeatedly in consecutive operations.

To further illustrate my mode of operation, the following examples are given, in which parts are by weight; but it will be understood that my invention is not limited to the details set forth.

Example 1

100 parts of a mixture of α-methyl-ionone a and α-methyl-ionone b (containing about 70 parts of the b-isomer are shaken in 400 parts of an aqueous formic acid solution (86%), maintained at a temperature of about 50° C. The mass is then allowed to settle, while maintaining the same temperature. 70 parts of an oil separate, consisting of substantially pure α-methyl-ionone b. Further purification may be had by vacuum distillation.

If the acid layer from the above treatment is diluted with water to about 50% H.COOH, additional 25 parts of an oil separate out, consisting predominantly of α-methyl-ionone a. This can be further purified by vacuum distillation.

The recovery of the α-constituent may also be effected by cooling the acid layer from the first separation to room temperature. In this case the acid layer obtained after the second separation may be used directly for separating another batch of the same materials.

My novel method of separation may be combined with the process of isomerization described in my co-pending application, Serial No. 39,442, of even date herewith, resulting in an exceptionally efficient, smooth working, and economical process. This is illustrated in the following example.

Example 2

A mixture of 200 parts of ψ-methyl-ionone and 1000 parts of 76% formic acid solution is heated under reflux, until further formation of the oily reaction product is no longer observed. The isomerization product consists of about 45% α-methyl-ionone b and about 55% α-methyl-ionone a. The mass is now cooled to 80° C. and maintained at this temperature without agitation until it has settled into layers. The oily layer, which corresponds in weight to about 135 parts is removed, and is subjected to fractionation from 86% formic acid according to the process described in Example 1 above. It consists essentially of α-methyl-ionone b and α-methyl-ionone a in the ratio 7:3.

The acid layer from the first separation above mentioned is now cooled to room temperature, and the new oily layer of a weight corresponding to some 40 parts is recovered. It consists predominantly of α-methyl-ionone a. The formic acid layer from this operation may be used directly for treating in a similar manner a subsequent batch of ψ-methyl-ionone.

It will be understood that my invention is susceptible of wide variation in details without departing from the spirit of this invention. Thus, the temperature of the formic acid-methyl-ionone mixture prior to separation may be considerably above the preferred separation temperature, and may be sufficiently high to dissolve the entire oil. The temperature of separation itself may vary within wide limits. It may be as high as the boiling point of the formic acid solution employed. On the other hand it may be as low as room temperature. In the latter case the second separation is effected at below room temperature by the aid of refrigeration.

The quantity of acid required should be sufficiently great to keep one of the components of the mixture in solution at the temperature of separation, and should not be so great as to dissolve entirely both components at the same temperature. Thus, at 50° C. and with 86% formic acid, the solubility of the a-isomer is about 15%; that of the b-isomer about 2%.

I claim:

1. A process of separating into its isomers a mixture of α-methyl-ionone b and α-methyl-ionone a, which comprises fractionally separating the same from a solution in aqueous formic acid of 60 to 90% strength.

2. A process for separating into its isomers a mixture of α-methyl-ionone b and α-methyl-ionone a, which comprises agitating the mixture with formic acid of between 60 and 90% strength, and settling the mass into layers at a temperature of about 50° C. to 100° C.

3. A process as in claim 2, followed by the steps of removing the oily layer, and then cooling the aqueous-acid layer to room temperature to settle out another layer of oil.

4. A process for separating the components of a mixture of α-methyl-ionone b and α-methyl-ionone a in which the a-component constitutes not over 35% of the mixture, which comprises agitating the mixture with formic acid of between 80 and 90% strength, settling the mass into layers at a temperature of about 50° C., and recovering the oily layer, which constitutes substantially pure α-methyl-ionone b.

5. A process as in claim 4, followed by the step of cooling the acid layer to room temperature to settle out the remaining oil which consists predominantly of the a-isomer.

6. In the process of manufacturing methyl-ionones, the step which comprises heating pseudo-methyl-ionone with formic acid of a strength between 70 and 80%, and fractionating the product by cooling the reaction mass successively to two different temperatures, and separating the oily phase formed at each temperature.

7. In the process of manufacturing methyl-ionones, the step which comprises heating pseudo-methyl-ionone with formic acid of a strength between 70 and 80%, cooling the reaction mass to about 80° C., whereby to settle out a mixture consisting predominantly of α-methyl-ionone b, separating the acid layer and cooling the same to room temperature whereby to settle out a mixture consisting predominantly of α-methyl-ionone a.

WALTER CHRISTIAN MEULY.